US009373298B2

(12) United States Patent
Shin et al.

(10) Patent No.: US 9,373,298 B2
(45) Date of Patent: Jun. 21, 2016

(54) DISPLAY DEVICE AND DRIVING METHOD THEREOF

(75) Inventors: Ok-Kwon Shin, Asan-si (KR); Sun-Kyu Son, Suwon-si (KR); Jae-Han Lee, Asan-si (KR); Hee-Jin Choi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 400 days.

(21) Appl. No.: 13/009,544

(22) Filed: Jan. 19, 2011

(65) Prior Publication Data

US 2011/0234560 A1 Sep. 29, 2011

(30) Foreign Application Priority Data

Mar. 25, 2010 (KR) ........................ 10-2010-0026790

(51) Int. Cl.
*G06F 3/038* (2013.01)
*G09G 3/36* (2006.01)
*G09G 3/00* (2006.01)

(52) U.S. Cl.
CPC .............. *G09G 3/3688* (2013.01); *G09G 3/003* (2013.01); *G09G 3/3614* (2013.01); *G09G 2310/0291* (2013.01); *G09G 2310/061* (2013.01); *G09G 2320/0257* (2013.01)

(58) Field of Classification Search
CPC ................ G09G 2310/0291; G09G 2310/061; G09G 2320/0257; G09G 3/003; G09G 3/3614; G09G 3/3688
USPC ............... 345/89–90, 99, 690–691, 209, 204, 345/211–213, 208
See application file for complete search history.

(56) References Cited

U.S. PATENT DOCUMENTS

| | | | | |
|---|---|---|---|---|
| 7,515,132 | B2 * | 4/2009 | Kim | G09G 3/3688 341/144 |
| 2003/0227428 | A1 | 12/2003 | Nose | |
| 2003/0231154 | A1 * | 12/2003 | Yeo et al. | 345/89 |
| 2005/0206629 | A1 | 9/2005 | Tseng et al. | |
| 2006/0087484 | A1 | 4/2006 | Kumeta et al. | |
| 2007/0018939 | A1 | 1/2007 | Chen et al. | |
| 2007/0046604 | A1 * | 3/2007 | Tseng et al. | 345/90 |

(Continued)

FOREIGN PATENT DOCUMENTS

| | | |
|---|---|---|
| CN | 101025899 | 8/2007 |
| CN | 101310322 | 11/2008 |

(Continued)

OTHER PUBLICATIONS

European Search Report dated May 29, 2012.

(Continued)

*Primary Examiner* — Quan-Zhen Wang
*Assistant Examiner* — Tony Davis
(74) *Attorney, Agent, or Firm* — F.Chau & Associates, LLC

(57) ABSTRACT

A display device includes a signal controller processing an input image signal and an input control signal and outputting an image signal and a control signal. A gray voltage generator generates reference gray voltages. The control signal includes a selection signal. A data driver generates gray voltages based on the reference gray voltage, selects a gray voltage corresponding to the image signal among the generated gray voltages, and applies the selected gray voltage to a pixel as a first data voltage. The data driver applies a black data voltage corresponding to a black image to the pixel according to the selection signal.

18 Claims, 8 Drawing Sheets

(56) References Cited

U.S. PATENT DOCUMENTS

| | | | | |
|---|---|---|---|---|
| 2007/0052568 | A1* | 3/2007 | Horibata | 341/144 |
| 2007/0139338 | A1* | 6/2007 | Lin | G09G 3/3696 345/96 |
| 2007/0171169 | A1 | 7/2007 | Hirama | |
| 2007/0195052 | A1 | 8/2007 | Oh et al. | |
| 2007/0242068 | A1 | 10/2007 | Han et al. | |
| 2007/0257875 | A1* | 11/2007 | Hsieh | 345/89 |
| 2008/0150866 | A1 | 6/2008 | Maki | |
| 2008/0204439 | A1* | 8/2008 | Morita | 345/209 |
| 2008/0309686 | A1 | 12/2008 | Endo et al. | |
| 2009/0167666 | A1 | 7/2009 | Min | |
| 2009/0213146 | A1* | 8/2009 | Hong et al. | 345/690 |
| 2009/0219270 | A1* | 9/2009 | Penev et al. | 345/211 |
| 2010/0033413 | A1* | 2/2010 | Song et al. | 345/89 |
| 2010/0033463 | A1* | 2/2010 | Nishimura | H03F 3/3022 345/211 |
| 2010/0033472 | A1* | 2/2010 | Choi | G09G 3/3688 345/213 |
| 2010/0045583 | A1* | 2/2010 | Park et al. | 345/90 |
| 2010/0079418 | A1* | 4/2010 | Myung | G09G 3/006 345/204 |
| 2010/0103199 | A1* | 4/2010 | Chen | G09G 3/20 345/690 |
| 2010/0134462 | A1* | 6/2010 | Kim | G09G 3/3688 345/211 |
| 2010/0134530 | A1* | 6/2010 | Lee | 345/690 |
| 2010/0171688 | A1* | 7/2010 | Wang | 345/99 |
| 2010/0214309 | A1* | 8/2010 | Bae | G09G 3/3655 345/589 |
| 2010/0231577 | A1* | 9/2010 | Kim | G09G 3/3648 345/212 |
| 2010/0245400 | A1* | 9/2010 | Nakahata et al. | 345/690 |
| 2010/0265273 | A1* | 10/2010 | Nishimura | G09G 3/3688 345/690 |
| 2010/0277494 | A1* | 11/2010 | Cho et al. | 345/589 |
| 2011/0012887 | A1* | 1/2011 | Lee | G09G 3/3648 345/212 |
| 2011/0050680 | A1* | 3/2011 | Chung et al. | 345/214 |
| 2011/0058024 | A1* | 3/2011 | Choi et al. | 348/51 |
| 2012/0033053 | A1* | 2/2012 | Park et al. | 348/51 |

FOREIGN PATENT DOCUMENTS

| | | |
|---|---|---|
| CN | 101452682 | 6/2009 |
| CN | 101645695 | 2/2010 |
| CN | 101646097 | 2/2010 |
| JP | 09-051552 | 2/1997 |
| JP | 2001-042282 | 2/2001 |
| JP | 2004-165713 | 6/2004 |
| JP | 2007-286623 | 11/2007 |
| JP | 2008-0158491 | 7/2008 |
| JP | 2008-309839 | 12/2008 |
| JP | 2009-033230 | 2/2009 |
| JP | 2009-516228 | 4/2009 |
| JP | JP 2009-516228 | 4/2009 |
| KR | 10-0418088 | 1/2004 |
| KR | 10-2006-0087711 | 8/2006 |
| KR | 1020070083350 | 8/2007 |
| KR | 10-2008-0049664 | 6/2008 |
| KR | 10-0893616 | 4/2009 |
| KR | 10-0922926 | 10/2009 |

OTHER PUBLICATIONS

English Abstract for Publication No. 09-051552.
English Abstract for Publication No. 2001-042282.
English Abstract for Publication No. 10-0418088.
English Abstract for Publication No. 2004-165713.
English Abstract for Publication No. 10-2006-0087711.
English Abstract for Publication No. 2007-286623.
English Abstract for Publication No. 10-2008-0049664.
English Abstract for Publication No. 2008-0158491.
English Abstract for Publication No. 2008-309839.
English Abstract for Publication No. 2009-033230.
English Abstract for Publication No. 10-0893616.
English Abstract for Publication No. 10-0922926.

* cited by examiner

DISPLAY DEVICE AND DRIVING METHOD THEREOF

CROSS-REFERENCE TO RELATED APPLICATION

This application claims priority to Korean Patent Application No. 10-2010-0026790 filed in the Korean Intellectual Property Office on Mar. 25, 2010, the entire contents of which are incorporated herein by reference.

BACKGROUND OF THE INVENTION (a) Technical Field

The present invention relates to a display device, and particularly to a display device and a driving method thereof.

(b) Discussion of the Related Art

Generally, a liquid crystal display (LCD) includes a liquid crystal panel assembly. The panel assembly has a plurality of pixels and each pixel includes a switching element and display signal lines. The panel assembly also includes a gray voltage generator generating a reference gray voltage and a data driver generating a plurality of gray voltages. The plurality of gray voltages are generated using the reference gray voltage. A gray voltage corresponding to the image signal among the generated gray voltages is applied as a data signal to the data line among the display signal lines.

The liquid crystal panel assembly includes a display panel provided with the pixel electrode and a liquid crystal layer having dielectric anisotropy. The pixel electrodes are arranged in a matrix and are connected to switching elements such as a thin film transistor (TFT). The switching elements thereby sequentially receive the data voltages row-by-row. The liquid crystal layer on the pixel electrode acts as a liquid crystal capacitor and the liquid crystal capacitor forms a pixel along with a switching element connected thereto.

In the liquid crystal display, the voltage is applied to the pixel electrode to generate an electric field in the liquid crystal layer and the transmittance of light passing through the liquid crystal layer is controlled by controlling the intensity of the electric field, thereby displaying desired images. To prevent a degradation phenomenon or flickering generated as the electric field is applied in one direction for a long period of time, the polarity of data voltages with respect to a common voltage is inverted by frame, row, or pixel.

The gray voltage generator generates reference gray voltages of a predetermined number according to a gamma curve of the liquid crystal display and a group having a positive value and a group having a negative value with respect to the common voltage Vcom are generated. The data driver divides the reference gray voltages to generate gray voltage for all grays and selects the data signal.

When the common voltage Vcom is shifted, the desired luminance might not be obtained, and particularly, display deterioration may be easily recognized in a low gray. Accordingly, the value of the reference gray voltage for the lowest gray is determined to have a predetermined difference from the common voltage Vcom. Accordingly, the available range of the voltage used by the data driver has a predetermined difference from the common voltage Vcom.

In this case, when it is necessary to insert a black image between frames displaying the images, the data driver cannot output the common voltage Vcom such that the complete black may not be realized and the afterimages of the previous frame may remain due to the response speed of the liquid crystal.

SUMMARY OF THE INVENTION

A display device according to an exemplary embodiment of the present invention includes a signal controller processing an input image signal and an input control signal to output an image signal and a control signal. A gray voltage generator generates reference gray voltages. The control signal includes a selection signal. A data driver generates gray voltages based on the reference gray voltages, selects a gray voltage corresponding to the image signal among the generated gray voltages, and applies the selected gray voltage to a pixel as a first data voltage. The data driver applies a black data voltage corresponding to a black image to the pixel according to the selection signal.

The data driver may include a plurality of data driving circuits. A data driving circuit may include a first amplifier including two power terminals respectively connected to a first voltage and a second voltage and a second amplifier including two power terminals respectively connected to the first voltage and the second voltage. At least one of the first amplifier and the second amplifier may be applied with one of a second data voltage and a common voltage according to the selection signal.

At least one of the first amplifier and the second amplifier may output the first data voltage when receiving the second data voltage and may output the black data voltage when receiving the common voltage.

The first voltage may be a ground voltage (VSS), the second voltage may be a driving voltage (AVDD), and the common voltage may be half the driving voltage (AVDD).

The data driver may output the first data voltage and the black data voltage according to the selection signal alternately by frames.

The first data voltage may include a left eye data voltage corresponding to a left eye image signal and a right eye data voltage corresponding to a right eye image signal. A frame outputting the black data voltage may be inserted between a frame outputting the left eye data voltage and a frame outputting the right eye data voltage.

The data driver may include a plurality of data driving circuits, each data driving circuit may include a first amplifier including two power terminals respectively connected to a first voltage and a second voltage and a second amplifier including two power terminals respectively connected to the second voltage and a third voltage. At least one of the first amplifier and the second amplifier may receive one of a second data voltage and the second voltage according to the selection signal.

At least one of the first amplifier and the second amplifier may output the first data voltage when receiving the second data voltage, and may output the black data voltage when receiving the second voltage.

The first voltage may be a ground voltage (VSS), the third voltage may be a driving voltage (AVDD), the second voltage may be a half driving voltage (HAVDD) that is half the driving voltage (AVDD), and the common voltage may be the same as the half driving voltage (HAVDD).

The first data voltage outputted from the first amplifier and the first data voltage outputted from the second amplifier may have opposite polarities with reference to the common voltage. When a period for inverting a polarity of the first data voltage outputted from the first amplifier and the second amplifier is referred to as a blanking period, the second voltage may be inputted to an input terminal of at least one of the first amplifier and the second amplifier according to the selection signal in the blanking period.

A driving method of a display device according to an exemplary embodiment of the present invention includes a signal controller processing an input image signal and an input control signal and outputs an image signal and a control signal including a selection signal. A gray voltage generator generates reference gray voltages and a data driver generates gray voltages based on the reference gray voltages by selecting a gray voltage corresponding to the image signal among the gray voltages to generate a first data voltage, selecting one of the first data voltage and a common voltage according to the selection signal, and outputting a second data voltage to a pixel in a case of selecting the first data voltage or outputting a black data voltage corresponding to a black image to the pixel in a case of selecting the common voltage.

The method may further include outputting the second data voltage and the black data voltage according to the selection signal alternately by frames.

The second data voltage may include a left eye data voltage corresponding to a left eye image signal and a right eye data voltage corresponding to a right eye image signal. The method may further include outputting the left eye data voltage during a first frame, outputting the black data voltage during a second frame next to the first frame, and outputting the right eye data voltage during a third frame next to the second frame.

The data driver may include a plurality of data driving circuits, a data driving circuit may include the first amplifier including two power terminals connected to a first voltage and a second voltage and the second amplifier including two power terminals connected to the second voltage and a third voltage. In the selecting of one of the first data voltage and the common voltage, the selected voltage may be inputted to an input terminal of at least one of the first amplifier and the second amplifier.

The first data voltage outputted from the first amplifier and the first data voltage outputted from the second amplifier may have opposite polarities with reference to the common voltage. The method may further include inputting the second voltage to the input terminal of at least one of the first amplifier and the second amplifier according to the selection signal when inverting a polarity of the first data voltage outputted from the first amplifier and a polarity of the first data voltage outputted from the second amplifier to each other.

BRIEF DESCRIPTION OF THE DRAWINGS

The above and other features and aspects of the exemplary embodiments of the present invention will be described in detail with reference to the accompanying drawings, in which.

DETAILED DESCRIPTION OF THE EXEMPLARY EMBODIMENTS

Figure 1:
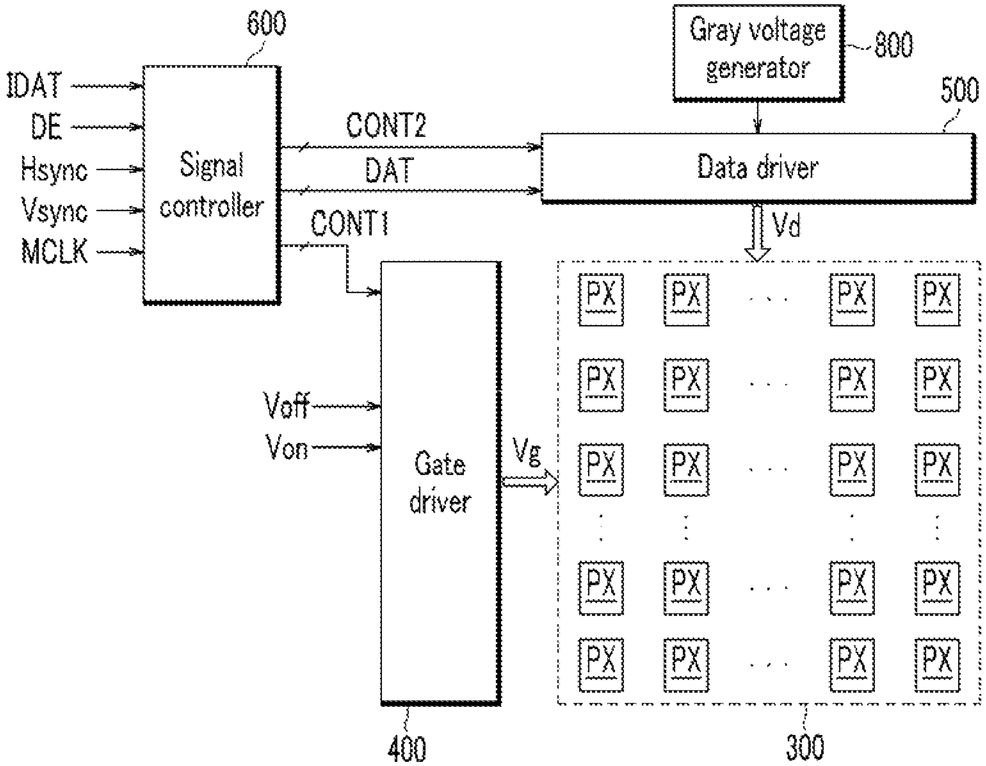
FIG. 1 is a block diagram of a liquid crystal display according to an exemplary embodiment of the present invention.

Exemplary embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals may designate like elements throughout the specification. It will be understood that when an element such as a layer, film, region, or substrate is referred to as being “on” another element, it can be directly on the other element or intervening elements may also be present.

Now, a liquid crystal display and a driving method thereof according to an exemplary embodiment of the present invention will be described with reference to accompanying drawings.

Figure 2:
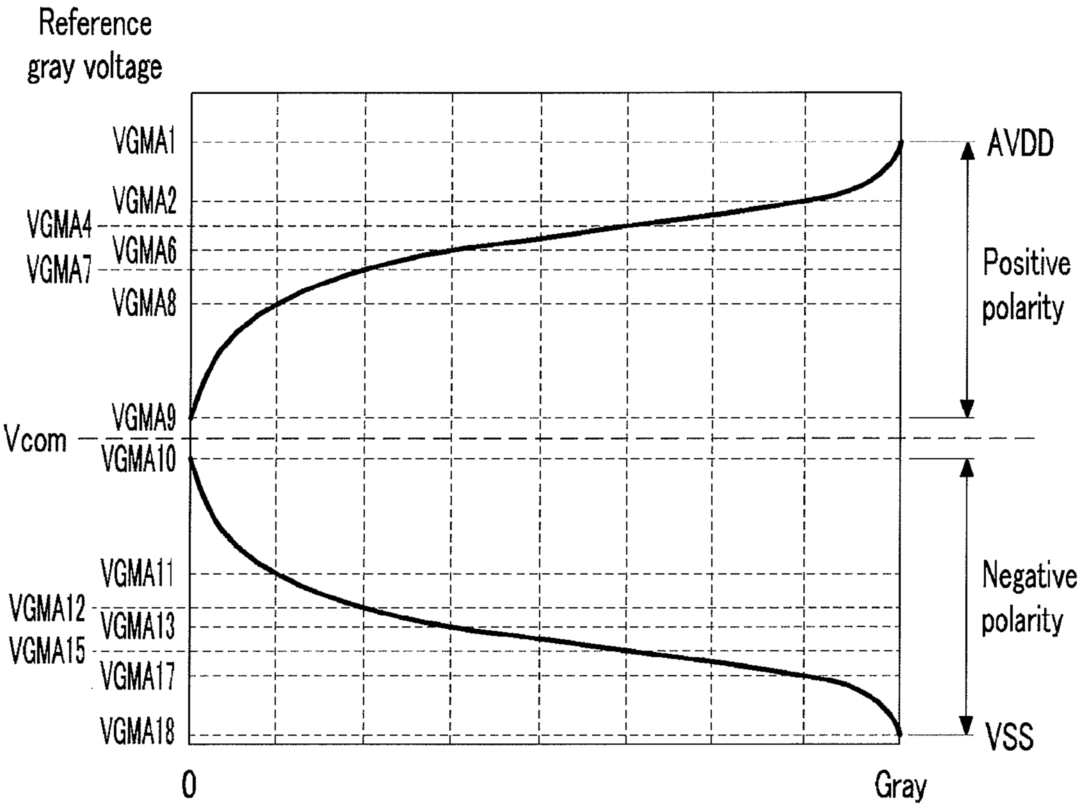
FIG. 2 is a gamma curve of a liquid crystal display according to an exemplary embodiment of the present invention.

FIG. 1 is a block diagram of a liquid crystal display according to an exemplary embodiment of the present invention, and FIG. 2 is a gamma curve of a liquid crystal display according to an exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

The liquid crystal panel assembly 300 includes a plurality of signal lines (not shown) and a plurality of pixels PX connected thereto and arranged in an approximate matrix. The liquid crystal panel assembly 300 may include lower and upper panels (not shown) facing each other, and a liquid crystal layer (not shown) therebetween.

The gray voltage generator 800 generates all gray voltages or gray voltages of a predetermined number (hereafter referred to as “reference gray voltages”) related to the transmittance of the pixel PX by using the first voltage and the second voltage. The first voltage VSS may be a ground voltage and the second voltage AVDD may be a driving voltage. However, the first and second voltages may be other voltages depending on the display device. For convenience, the first voltage is referred to as a ground voltage VSS, and the second voltage is referred to as a driving voltage AVDD.

Referring to FIG. 2, the reference gray voltage is shown in the case of a normally black mode, wherein the reference gray voltage includes a group VGMA1-VGMA9 of a positive polarity and a group VGMA10-VGMA18 of a negative polarity with respect to the common voltage Vcom. In FIG. 2, 18 reference gray voltages are exemplified; however the number of the reference gray voltages may be varied. Also, there may be a different number of the reference gray voltages used.

As shown in FIG. 2, the reference gray voltage VGMA9 representing the lowest gray among the reference gray voltages of the positive polarity has a predetermined difference from the common voltage Vcom, and the reference gray voltage VGMA10 representing the lowest gray among the reference gray voltages of the negative polarity also has a predetermined difference from the common voltage Vcom. The voltage between the two reference gray voltages VGMA9 and VGMA10 are not further divided and the two reference gray voltages VGMA9 and VGMA10 may be used in the data driver 500 as they are. Accordingly, the voltage range capable of being used by the data driver 500 is from the reference gray voltage VGMA9 to the reference gray voltage VGMA1 and from the reference gray voltage VGMA18 to the reference gray voltage VGMA10. The interval between the first voltage VSS and the second voltage AVDD is divided into the positive polarity section and the negative polarity section with reference to the common voltage Vcom and the reference gray voltages may be determined according to grays by a predetermined interval between the first voltage VSS and the second voltage AVDD.

Alternatively, the reference gray voltage VGMA1 representing the highest gray of the positive polarity may be less than the driving voltage AVDD and the reference gray voltage VGMA18 representing the highest gray of the negative polarity may be larger than the ground voltage VSS.

A liquid crystal display according to an exemplary embodiment of the present invention may be a normally white mode, and in this case, the graph is reversed of that shown in FIG. 2. For example, the reference gray voltage of the lowest gray of the positive polarity becomes VGMA1 and the reference gray voltage of the highest gray becomes VGMA9. Also, the reference gray voltage of the lowest gray of the negative polarity becomes VGMA18 and the reference gray voltage of the highest gray becomes VGMA10. In this case, the various characteristics according to the exemplary embodiment described above with reference to FIG. 2 may be applied.

Again referring to FIG. 1, the gate driver 400 is connected to a gate line (not shown) of the liquid crystal panel assembly 300 and the gate driver 400 applies a gate signal configured by a combination of a gate-on voltage Von and a gate-off voltage Voff to the gate line.

The data driver 500 is connected to the data line (not shown) of the liquid crystal panel assembly 300, divides the reference gray voltages VGMA1-VGMA18 from the gray voltage generator 800 to generate the gray voltages for the entire grays, and selects from among the gray voltages to generate the desired data voltage.

The signal controller 600 controls the gate driver 400, the data driver 500, and the driving voltage generator 700.

Now, the operation of the liquid crystal display will be described.

Referring to FIG. 1, the signal controller 600 receives input image signals IDAT and input control signals for controlling the input image signals from an external graphics controller (not shown). The input image signals IDAT contain information regarding luminance of the respective pixels PX, which has a predetermined number of grays, for example $1024=2^{10}$, $256=2^{8}$, or $64=2^{6}$. The input control signals include vertical synchronization signals Vsync, horizontal synchronization signals Hsync, main clock signals MCLK, and data enable signals DE.

The signal controller 600 properly processes the input image signals IDAT in accordance with the operating conditions of the liquid crystal panel assembly 300 based on the input image signals IDAT and input control signals, and generates gate control signals CONT1 and data control signals CONT2. Then, the signal controller 600 transmits the gate control signals CONT1 to the gate driver 400, while transmitting the data control signals CONT2 and the processed image signals DAT to the data driver 500. Depending upon the data control signals CONT2 from the signal controller 600, the data driver 500 receives the digital image signals DAT for one row of pixels PX and selects gray voltages corresponding to the respective digital image signals DAT. The digital image signals DAT are then converted into analog data voltages Vd and applied to the relevant data lines. The data control signal CONT2 includes a selection signal SE and the data driver 500 may apply the black data voltage VBL or a data voltage of a low gray near black to the data line according to the selection signal SE.

Depending on the gate control signals CONT1 from the signal controller 600, the gate driver 400 applies gate-on voltages Von to the gate lines so as to turn on the switching elements Q connected to the gate lines.

Thus, the data voltage applied to the data line is applied to the pixel electrode (not shown) of the corresponding pixel PX through the turned-on switching element Q. This appears as the pixel voltage of each pixel and the liquid crystal molecules of the liquid crystal layer may be inclined according to the pixel voltage. The change degree of the polarization of light passing through the liquid crystal layer is changed according to the inclination degree of liquid crystal molecules and accordingly the pixel PX may display the predetermined luminance corresponding to the gray of the image signal DAT.

By repeating such a process by one horizontal period (also referred to as "1H", equal to one period of the horizontal synchronization signal (Hsync) and the data enable signal DE), the gate-on signal Von is sequentially applied to all the gate lines and the data voltages are applied to all the pixels PX to display an image of one frame.

After one frame is terminated, a next frame is started. A state of an inversion signal RVS applied to the data driver 500 is controlled so that the polarity of the data voltage applied to each pixel PX is opposite to that in a previous frame ("frame inversion"). The polarity of the data voltage flowing on one data line may be periodically inverted even within one frame according to characteristics of the inversion signal RVS (for example, row inversion and dot inversion), or the polarities of the data voltages applied to adjacent data lines of one pixel row may be different from each other (for example, column inversion and dot inversion).

A frame displaying black may be inserted between two consecutive frames supplied with data voltages such that the first of the two frames does not leave an afterimage within the following frame.

Next, a data driver according to an exemplary embodiment of the present invention will be described with reference to FIG. 3, FIG. 4, and FIG. 5.

Figure 3:
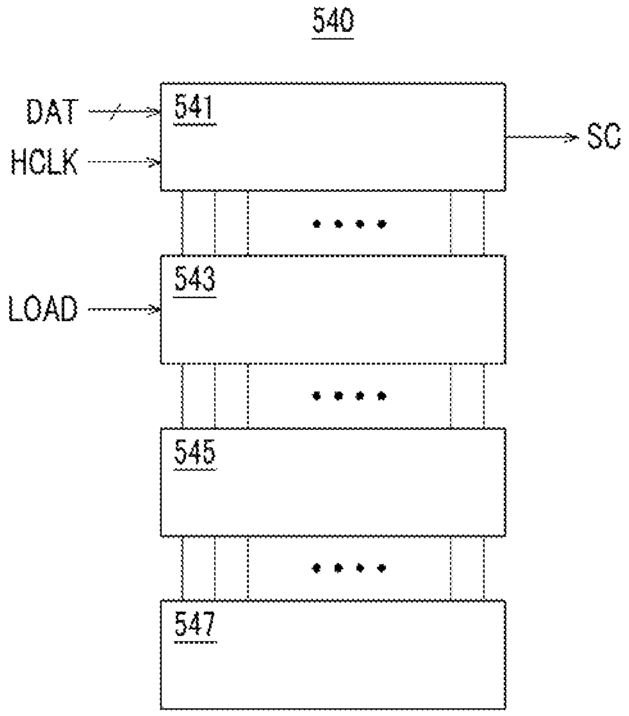
FIG. 3 is a block diagram of a data driver of a liquid crystal display according to an exemplary embodiment of the present invention.
Figure 4:
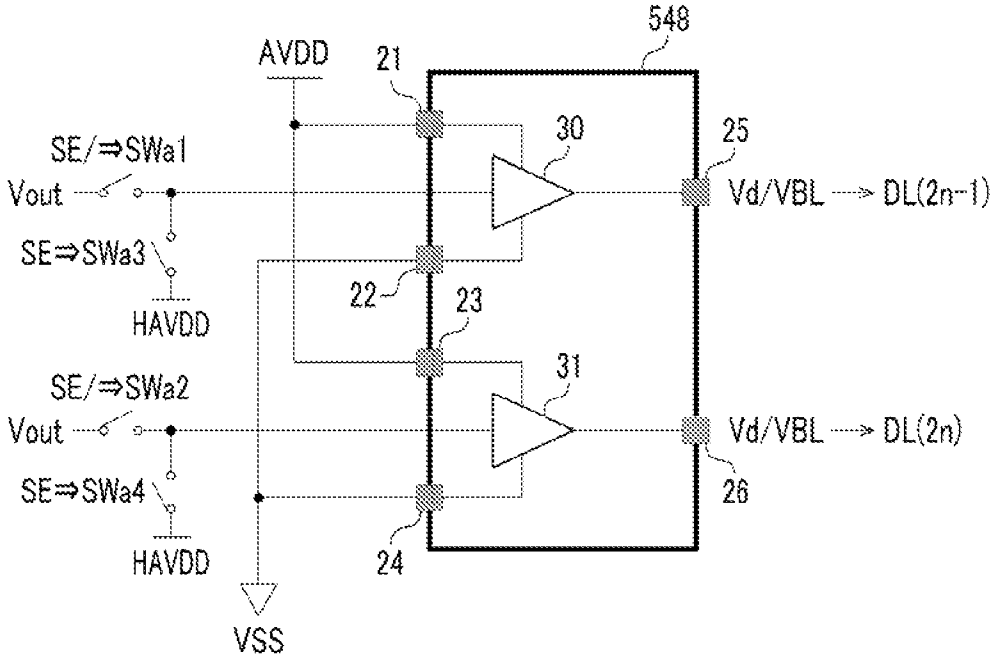
FIG. 4 and FIG. 5 are circuit diagrams of a buffer shown in FIG. 3 according to an exemplary embodiment of the present invention.
Figure 5:
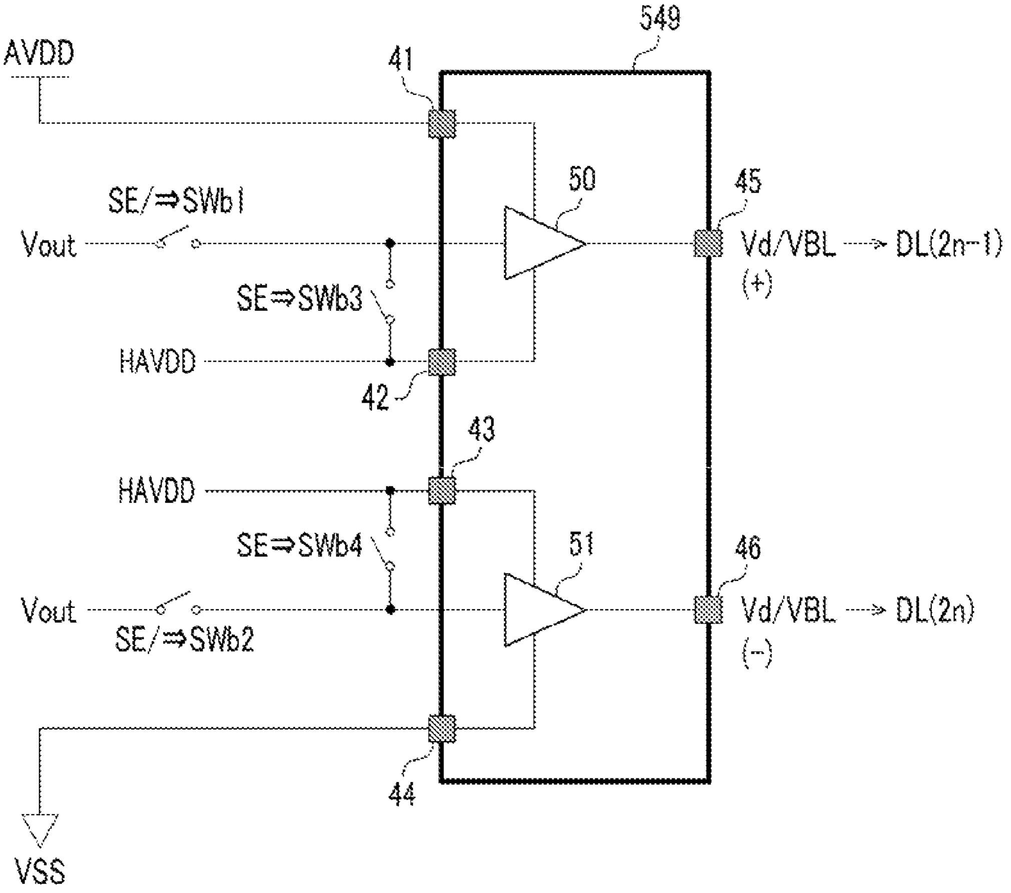

FIG. 3 is a block diagram of a data driver of a liquid crystal display according to an exemplary embodiment of the present invention, and FIG. 4 and FIG. 5 are circuit diagrams of a buffer of FIG. 3 according to an exemplary embodiment of the present invention.

The data driver 500 includes at least one of the data driving circuit 540 shown in FIG. 3 and the data driving circuit 540 includes a shift register 541, a latch 543, a digital-to-analog converter 545, and a buffer 547 that are sequentially connected.

The shift register 541 sequentially shifts image data DAT inputted according to a data clock signal HCLK to transmit it to the latch 543 when it is supplied with a horizontal synchronization start signal STH. When the data driver 500 includes a plurality of data driving circuits 540, the shift register 541 shifts all of the image data DAT that the shift register 541 controls, and thereafter outputs a shift clock signal SC to the shift register of a neighboring data driving IC.

The latch 543 receives the image data DAT sequentially from the shift register 541 stores it, and outputs it to the digital-to-analog converter 545 according to a load signal LOAD.

The digital-to-analog converter 545 converts the image data DAT supplied from the latch 543 into analog data voltages to output it to the buffer 547.

The buffer 547 outputs the data voltage Vout from the digital-to-analog converter 545 to the output terminal connected to the corresponding data line.

Referring to FIG. 4, a buffer 548 of a data driving circuit 540 according to an exemplary embodiment of the present invention includes an amplifier 30 having two power terminals 21 and 22 respectively connected to the driving voltage AVDD and the ground voltage VSS, and an amplifier 31 having two power terminals 23 and 24 respectively connected to the driving voltage AVDD and the ground voltage VSS.

The input terminal of the amplifier 30 may receive the data voltage Vout from the digital-to-analog converter 545 through the switching element SWa1 in response to the inverted selection signal SE/, or may receive the half driving voltage HAVDD that is half the driving voltage AVDD or the common voltage Vcom through the switching element SWa3 in response to the selection signal SE. For example, when the selection signal SE is high, the amplifier 30 is inputted with the half driving voltage HAVDD instead of the data voltage Vout. When the selection signal SE is low, the amplifier 30 may be inputted with the half driving voltage HAVDD.

The output voltage of the amplifier 30 is applied, as the data voltage Vd or the black data voltage VBL, to the corresponding data line, for example the odd-numbered data lines DL(2n−1), through the output terminal 25 according to the selection signal SE. When the data voltage Vd is inputted to the amplifier according to the selection signal SE, the data voltage Vd is applied to the corresponding data line, for example the odd-numbered data lines DL(2n−1), through the output terminal 25. Also, when the half driving voltage HAVDD or the common voltage Vcom as the black data voltage VBL is inputted to the amplifier 30 according to the selection signal SE, the black data voltage VBL may be applied to the corresponding data line, for example the odd-numbered data lines DL(2n−1), through the output terminal 25. The input terminal of the amplifier 31, like the amplifier 30, may also receive the data voltage Vout from the digital-to-analog converter 545 through the switching element SWa2 in response to the inverted selection signal SE/, or may receive the half driving voltage HAVDD that is half the driving voltage AVDD or the common voltage Vcom through the switching element SWa4 in response to the selection signal SE. The output voltage of the amplifier 31 is also applied to the corresponding data lines, for example the even-numbered data lines DL(2n), as the data voltage Vd or the black data voltage VBL, through the output terminal 26 according to the selection signal SE.

When the data voltage Vd is inputted to the amplifier 31 according to the selection signal SE, the data voltage Vd is applied to the corresponding data line, for example the even-numbered data line DL(2n), through the output terminal 26. Also, when the half driving voltage HAVDD or the common voltage Vcom, as the black data voltage VBL, is inputted to the amplifier 31 according to the selection signal SE, the black data voltage VBL may be applied to the corresponding data line, for example the even-numbered data line DL(2n), through the output terminal 26.

The range of the data voltage Vd is from the reference gray voltage VGMA9 to the reference gray voltage VGMA1 or from the reference gray voltage VGMA18 to the reference gray voltage VGMA10 that are shown in FIG. 2 as described above, and the black data voltage VBL may be the same as the half driving voltage HAVDD, which is the common voltage Vcom.

Referring to FIG. 5, a buffer 549 of a data driving circuit 540 according to an exemplary embodiment of the present invention includes an amplifier 50 having two power terminals 41 and 42 respectively connected to the driving voltage AVDD and the half driving voltage HAVDD, and an amplifier 51 having two power terminals 43 and 44 respectively connected to the half driving voltage HAVDD and the ground voltage VSS.

The input terminal of the amplifier 50 may receive the data voltage Vout from the digital-to-analog converter 545 through the switching element SWb1 in response to the inverted selection signal SE/, or may receive the half driving voltage HAVDD through the switching element SWb3 in response to the selection signal SE. For example, when the selection signal SE is high, the amplifier 50 is inputted with the half driving voltage HAVDD instead of the data voltage Vout. When the selection signal SE is low, the amplifier 50 may be inputted with the half driving voltage HAVDD.

The output voltage of the amplifier 50, as the data voltage Vd or the black data voltage VBL, is applied to the corresponding data line, for example, the odd-numbered data lines DL(2n−1), through the output terminal 45 according to the selection signal SE. The polarity of the data voltage Vd may be a positive polarity (+).

When the data voltage Vd is inputted to the amplifier 50 according to the selection signal SE, the data voltage Vd is applied to the corresponding data line, for example the odd-numbered data line DL(2n−1), through an output terminal 45. Also, when the half driving voltage HAVDD or the common voltage Vcorn, as the black data voltage VBL, is inputted to the amplifier 50 according to the selection signal SE, the black data voltage VBL may be applied to the corresponding data line, for example the odd-numbered data line DL(2n−1), through an output terminal 46.

The input terminal of the amplifier 51 may also receive the data voltage Vout from the digital-to-analog converter 545 through the switching element SWb2 in response to the inverted selection signal SE/ or may receive the half driving voltage HAVDD through the switching element SWb4 in response to the selection signal SE. The output voltage of the amplifier 51 is also applied, as the data voltage Vd or the black data voltage VBL, to the corresponding data line, for example the even-numbered data lines DL(2n), through the output terminal 46 according to the selection signal SE. The polarity of the data voltage Vd may be a negative polarity (−).

It is not necessary to separately apply the half driving voltage HAVDD or the common voltage Vcom. The voltage applied to the power terminals 42 and 43 may be used as it is as the input voltage.

The range of the data voltage Vd may be from the reference gray voltage VGMA9 to the reference gray voltage VGMA1 in the case of a positive polarity, and the range of the data voltage Vd is from the reference gray voltage VGMA18 to the reference gray voltage VGMA10 in the case of a negative polarity. The black data voltage VBL may be the same as the half driving voltage HAVDD, for example, the common voltage Vcom.

According to an exemplary embodiment of the present invention discussed above with reference to FIG. 5, when the polarity of the data voltage Vd applied to the respective data lines DL(2n−1) and DL(2n) is changed (e.g. frame inversion or dot inversion), the data lines DL(2n−1) and DL(2n) connected to the output terminals 45 and 46 may be switched through a polarity switching circuit (not shown). This period is referred to as a blanking period.

As described above, when displaying black, the half driving voltage HAVDD or the common voltage Vcom is directly supplied to the circuit of the data driver 500 according to the selection signal SE such that the data line may be supplied with the black data voltage VBL. Accordingly, compared with the case of displaying black by using the reference gray voltage corresponding to the 0 gray, an overshoot is generated by the difference between the reference gray voltage VGMA9 or VGMA10 and the half driving voltage HAVDD or the common voltage Vcom such that the response speed of the liquid crystal is increased, an image nearest to black may be displayed, and the time for arriving at black may be shortened.

Figure 6:
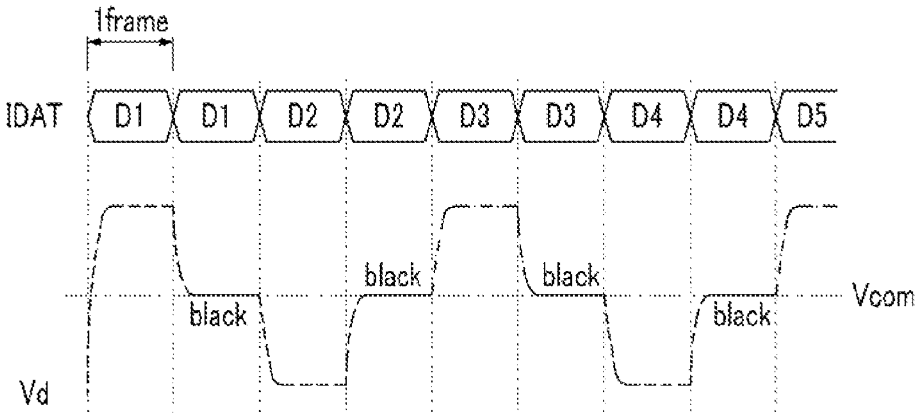
FIG. 6 is a waveform diagram of an input image signal and a data voltage according to an exemplary embodiment of the present invention.

FIG. 6 is a waveform diagram of an input image signal and a data voltage according to an exemplary embodiment of the present invention.

Referring to FIG. 6, the signal controller 600 is inputted with the input image signal D1 of one frame and the data driver 500 applies the data voltage Vd of the positive polarity for the input image signal D1 to the data line. In the next frame, the half driving voltage HAVDD, for example, the common voltage Vcom, is inputted to the data driving circuit 540 according to the selection signal SE while the input image signal D1 is inputted to the signal controller 600 such that the black data voltage VBL is outputted from the output terminal of the data driving circuit 540. The black data voltage VBL may be substantially the same as the common voltage Vcom. Next, in the next frame, when the input image signal D2 is inputted to the signal controller 600, the data driver 500 generates the data voltage Vd of the negative polarity according to the frame inversion and outputs it to the data line. In the next frame, the half driving voltage HAVDD, for example, the common voltage Vcom, is inputted to the data driving circuit 540 according to the selection signal SE while the input image signal D2 is inputted to the signal controller 600, such that the black data voltage VBL is outputted from the output terminal of the data driving circuit 540. The black data voltage VBL may be substantially the same as the common voltage Vcom. The next frame may be executed as described above. As described above, when a black frame is inserted between frames to remove the afterimage of the previous frame, the real black may be displayed during a sufficient time through the quick response speed of the liquid crystal according to an exemplary embodiment of the present invention.

Next, an exemplary embodiment for displaying the black image in the stereoscopic image display device will be described with reference to FIG. 7 and FIG. 8.

Figure 7:
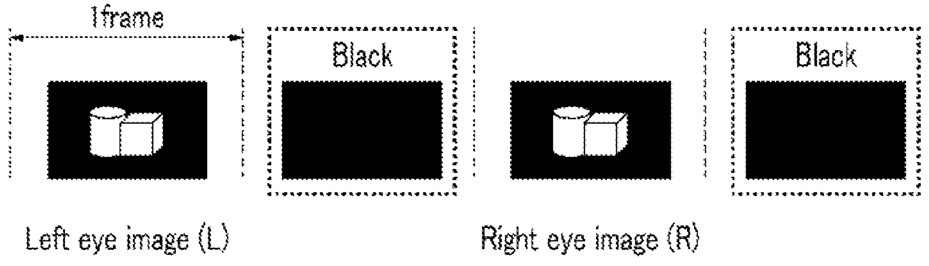
FIG. 7 is a view showing images by frames of a stereoscopic image display device according to an exemplary embodiment of the present invention.
Figure 8:
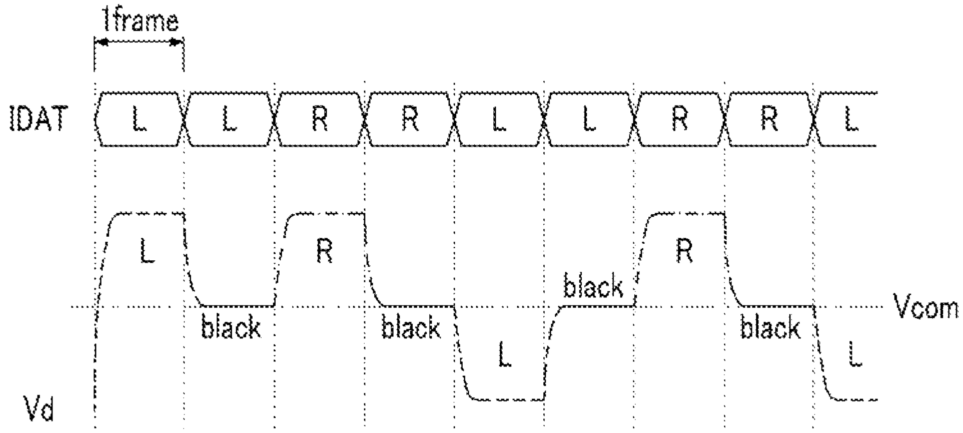
FIG. 8 is a waveform diagram of an input image signal and a data voltage for a left eye and a right eye in the stereoscopic image display device of FIG. 7 according to an exemplary embodiment of the present invention.

FIG. 7 is a view showing images by frames of a stereoscopic image display device according to an exemplary embodiment of the present invention and FIG. 8 is a waveform diagram of a input image signal and a data voltage for a left eye and a right eye according to an exemplary embodiment of the present invention in the stereoscopic image display device of FIG. 7.

The stereoscopic image display device according to the present exemplary embodiment divides imaged into a left eye image and a right eye image and displays them during different frames. A shutter of glasses is shut off or opened responding to the displayed images. Therefore, the stereoscopic image is recognized. For the afterimage of the previous image not to remain in the process in which the left eye image is changed to the right eye image or the right eye image is changed to the left eye image, a frame displaying black may be inserted between two frames.

Referring to FIG. 8, if a left eye input image signal L of one frame is inputted to the signal controller 600, the data driver 500 applies the data voltage Vd for the input image signal L to the data line. The data voltage Vd may have the positive polarity. In the next black frame, the half driving voltage HAVDD, for example, the common voltage Vcom, is inputted to the data driving circuit 540 according to the selection signal SE while the previous input image signal L is inputted to the signal controller 600 such that the black data voltage VBL is outputted from the output terminal of the data driving circuit 540. The black data voltage VBL may be substantially the same as the common voltage Vcom. Next, in the next frame, when the right eye input image signal R is inputted to the signal controller 600, the data driver 500 generates the data voltage Vd accordingly and outputs it to the data line. The data voltage Vd may have the positive polarity. Next, in the frame, the black data voltage VBL is output, and the left eye data voltage Vd, the black data voltage VBL, and the right eye data voltage Vd are sequentially output. The polarity of the data voltage Vd may have the negative polarity.

As described above, when a black frame is inserted between the right eye frame and the left eye frame to remove the afterimage of the previous frame, the real black may be displayed during a sufficient time through the quick response speed of the liquid crystal, such that the afterimage may be further completely removed.

Next, a driving method of a liquid crystal display according to an exemplary embodiment of the present invention will be described with reference to FIG. 9 and FIG. 10 as well as FIG. 1 to FIG. 3 and FIG. 5.

Figure 9:
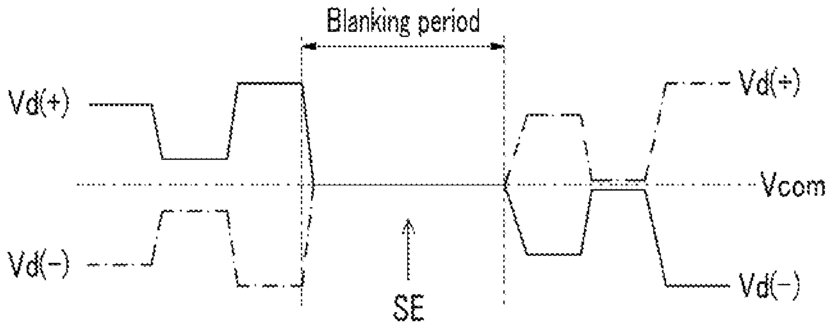
FIG. 9 is a waveform diagram of a data voltage in a case that polarity inversion between frames is generated in the liquid crystal display including the buffer of the data driver of FIG. 5 according to an exemplary embodiment of the present invention.
Figure 10:
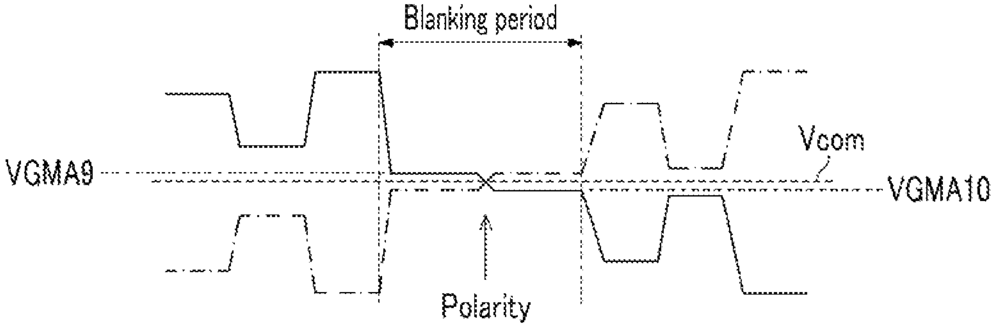
FIG. 10 is a waveform diagram of the data voltage where polarity inversion between frames is generated in the liquid crystal display including the buffer of the data driver of FIG. 5.

FIG. 9 is a waveform diagram of a data voltage according to an exemplary embodiment of the present invention in a case that polarity inversion between frames is generated in the liquid crystal display including the buffer of the data driver of FIG. 5 and FIG. 10 is a waveform diagram of the data voltage according to the conventional art in a case that polarity inversion between frames is generated in the liquid crystal display including the buffer of the data driver of FIG. 5.

As described above, in the exemplary embodiment shown in FIG. 5, when changing the polarities of the data voltages Vd applied to the data lines DL(2n−1) and DL(2n) (frame inversion, dot inversion), the data lines DL(2n−1) and DL(2n) connected to the output terminals 45 and 46 may be switched through a separate polarity switching circuit (not shown), and this period is referred to as a blanking period. Thus, as shown in FIG. 9, the data voltages Vd applied to the respective data lines are changed from the positive polarity (+) to the negative polarity (−), or from the negative polarity (−) to the positive polarity (+).

In a blanking period, when the half driving voltage HAVDD or the common voltage Vcom is inputted to the amplifiers 50 and 51 of the data driving circuit 540 according to the selection signal SE, the data driver 500 may output substantially the same voltage as the common voltage Vcom. Accordingly, as shown in FIG. 10, a phenomenon in which an inverse bias is applied to the respective amplifiers 50 and 51 is not generated in the blanking period such that the size of the data driver 500 may be reduced.

The data driving circuit 540 may connect all output terminals of the buffer 549 inside to each other in the blanking period such that a charge sharing voltage having a level of the common voltage Vcom that is approximately a middle value of the positive polarity and the negative polarity data line voltages Vd may be generated. This charge sharing voltage may be used as an impulsive voltage and this impulsive voltage may be applied to the plurality of pixels in the blanking period, thereby displaying black.

Exemplary embodiments of the present invention have been described above for use with a liquid crystal display. However the present invention may be applied to various display devices in which the luminance is changed according to the difference between the common voltage and the data voltage, thereby displaying the images.

As described in an exemplary embodiment of the present invention, when displaying black, the half driving voltage HAVDD or the common voltage Vcom is directly supplied to the circuit of the data driver according to the selection signal such that the black data voltage may be applied to the data line without using the reference gray voltage generated in the gray voltage generator. Accordingly, compared with the case that the lowest gray is displayed by using the reference gray voltage corresponding to the lowest gray, the response speed is quick, an image nearest to black may be displayed, and the time for reaching black may be reduced.

While this invention has been described above in connection with exemplary embodiments, it is to be understood that the invention is not limited to the disclosed embodiments, but, on the contrary, is intended to cover various modifications and equivalent arrangements.

What is claimed is:

1. A display device comprising:

a signal controller processing an input image signal and an input control signal and outputting an image signal and a control signal, wherein the control signal includes a selection signal for selecting when a black data voltage corresponding to a black image is to be displayed; and a data driver comprising a digital-analog converter converting the image signal to an analog data voltage based on gray voltages, a buffer including a first amplifier and a second amplifier, a first switch, a second switch, a third switch, and a fourth switch, wherein the first switch is connected between the digital-analog converter and an input terminal of the first amplifier, the second switch is connected between the digital-analog converter and an input terminal of the second amplifier, the third switch is connected between a common voltage terminal and the input terminal of the first amplifier, and the fourth switch is connected between the common voltage terminal and the input terminal of the first amplifier, wherein the first, second, third, and fourth switches are controlled by the selection signal or an inverted signal of the selection signal, wherein when the selection signal is in a first level, the analog data voltage is input to the input terminal of the first amplifier via the first switch or input to the input terminal of the second amplifier via the second switch, wherein when the selection signal is in a second level, which is different from the first level, the common voltage is input to the input terminal of the first amplifier via the third switch or input to the input terminal of the second amplifier via the fourth switch, to display a black image, and wherein a value of the common voltage is not dependent upon the gray voltages.

2. The display device of claim 1, wherein the first amplifier and the second amplifier output a first data voltage when receiving the analog data voltage, and output the black data voltage when receiving the common voltage.

3. The display device of claim 2, wherein the common voltage is half the driving voltage (AVDD).

4. The display device of claim 3, wherein the data driver outputs the first data voltage and the black data voltage according to the selection signal alternately by frames.

5. The display device of claim 4, wherein the first data voltage comprises a left eye data voltage corresponding to a left eye image signal and a right eye data voltage corresponding to a right eye image signal, and a frame outputting the black data voltage is inserted between a frame outputting the left eye data voltage and a frame outputting the right eye data voltage.

6. The display device of claim 2, wherein the data driver outputs the first data voltage and the black data voltage according to the selection signal alternately by frames.

7. The display device of claim 2, wherein the first data voltage comprises a left eye data voltage corresponding to a left eye image signal and a right eye data voltage corresponding to a right eye image signal, and a frame outputting the black data voltage is inserted between a frame outputting the left eye data voltage and a frame outputting the right eye data voltage.

8. The display device of claim 1, wherein:

the first amplifier includes two power terminals respectively connected to the first voltage and the second voltage, and the second amplifier includes two power terminals respectively connected to the second voltage and a third voltage; and the second voltage is the same as the common voltage.

9. The display device of claim 8, wherein the first amplifier and the second amplifier output a first data voltage when receiving the analog data voltage, and output the black data voltage when receiving the second voltage.

10. The display device of claim 9, wherein the common voltage is the same as the half driving voltage (HAVDD).

11. The display device of claim 10, wherein the data driver outputs the first data voltage and the black data voltage according to the selection signal, alternately by frames.

12. The display device of claim 11, wherein the first data voltage includes a left eye data voltage corresponding to a left eye image signal and a right eye data voltage corresponding to a right eye image signal, and a frame outputting the black data voltage is inserted between a frame outputting the left eye data voltage and a frame outputting the right eye data voltage.

13. The display device of claim 8, wherein the first data voltage outputted from the first amplifier and the first data voltage outputted from the second amplifier have opposite polarities with reference to the common voltage, and when a period for inverting a polarity of the first data voltage outputted from the first amplifier and the second amplifier is a blanking period, the second voltage is inputted to the input terminal of the at least one of the first amplifier and the second amplifier via the third and fourth switches according to the selection signal in the blanking period.

14. The display device of claim 13, wherein the third voltage is a driving voltage (AVDD) and the common voltage is the same as the half driving voltage (HAVDD).

15. A method for driving a display device including a signal controller processing an input image signal and an input control signal and outputting an image signal and a control signal including a selection signal for selecting when a black data voltage corresponding to a black image is to be displayed, and a data driver comprising a plurality of data driving circuits, each of which comprises a digital-analog converter converting the image signal to an analog data voltage, a buffer including a first amplifier and a second amplifier, and a plurality of switches, wherein the plurality of switches comprises a first switch, a second switch, a third switch and a fourth switch, the first switch is connected between the digital-analog converter and an input terminal of the first amplifier, the second switch is connected between the digital-analog converter and an input terminal of the second amplifier, the third switch is connected between a common voltage and the input terminal of the first amplifier, and the fourth switch is connected between the common voltage and the input terminal of the first amplifier, the method comprising:

generating the analog data voltage;

selecting one of the analog data voltage and inputting the analog data voltage to the input terminal of the first amplifier via the first switch or to the input terminal of the second amplifier via the second switch when the selection signal is in a first level by the second switch;

selecting the common voltage and inputting the common voltage to the input terminal of the first amplifier via the third switch or to the input terminal of the second amplifier via the fourth switch when the selection signal is in a second level which is different from the first level by the first switch, the common voltage being transmitted from a single voltage terminal;

outputting a first data voltage to a pixel when the analog data voltage is input to the input terminal of the first or second amplifier; and outputting the black data voltage to the pixel when the common voltage is input to the input terminal of the first or second amplifier, wherein a value of the common voltage is not dependent upon the analog data voltage.

16. The method of claim 15, wherein the outputting of the first data voltage and the black data voltage is performed alternately by frames.

17. The method of claim 15, wherein the first data voltage comprises a left eye data voltage corresponding to a left eye image signal and a right eye data voltage corresponding to a right eye image signal, and the method further comprises:

outputting the left eye data voltage during a first frame;

outputting the black data voltage during a second frame subsequent to the first frame; and outputting the right eye data voltage during a third frame subsequent to the second frame.

18. The method of claim 15, wherein:

the first data voltage outputted from the first amplifier and the first data voltage outputted from the second amplifier have opposite polarities with reference to the common voltage, and the method further comprising inputting the second voltage to the input terminal of at least one of the first amplifier and the second amplifier via the third and fourth switches according to the selection signal when inverting a polarity of the first data voltage outputted from the first amplifier and when inverting a polarity of the first data voltage outputted from the second amplifier.

* * * * *